United States Patent [19]

Murray

[11] Patent Number: 4,950,453
[45] Date of Patent: Aug. 21, 1990

[54] INHIBITING CORROSION BY WATER

[76] Inventor: W. Bruce Murray, 28 Willow Grove, Garden Grove, Calif. 92714

[21] Appl. No.: 345,449

[22] Filed: May 1, 1989

[51] Int. Cl.$^5$ .............................................. C23F 11/06
[52] U.S. Cl. ......................................... 422/3; 422/13; 210/696; 210/746; 210/752
[58] Field of Search ..................... 210/696, 746, 749; 422/13, 7, 3, 15; 252/389.54, 387; 148/241; 427/8; 436/6

[56] References Cited

U.S. PATENT DOCUMENTS 3,960,576  6/1976  Carter et al. ........................... 422/15
4,239,648  12/1980  Marshall et al. ..................... 210/749
4,268,397  5/1981  Horie et al. .......................... 210/746

OTHER PUBLICATIONS

Stericker, William, "Sodium Silicates in Water to Prevent Corrosion", Jul. 27, 1937.
Uhlig, Herbert, "Corrosion and Corrosion Control", Chapter 5, p. 57, 1963.
"Betz Handbook of Industrial Water Conditioning", 7th ed., pp. 200–201, 1976.

Primary Examiner—Peter Hruskoci
Assistant Examiner—Krisanne Shideler
Attorney, Agent, or Firm—Plante, Strauss, Vanderburgh & Connors

[57] ABSTRACT

There is disclosed a method for the protection of metal surfaces against corrosion by the formation of a passivating coating of zinc silicate on the surfaces of the metals exposed to the water. The metal surfaces are preconditioned by contact with water containing a soluble zinc salt in an amount from about 0.5 to about 5 parts zinc per million weight parts of the water while the total alkalinity is maintained above 100 millequivalents by the addition of a water soluble alkaline material, as needed. The pretreatment passivates the metal surfaces with a coating of zinc carbonate, as can be determined by measuring the magnitude of external current flow between electrodes of a test probe maintained in the water. When the metal has been coated with a film of zinc carbonate, typically after a few days to a week, the addition of the zinc salt is ceased, and a water soluble silicate, particularly sodium orthsilicate or sodium metasilicate is added to the water in an amount from about 1 to 10 parts per million of silicate. The addition of this silicate effectively deposits a protective coating of zinc silicate on the surfaces of the metal subjected to corrosion, particularly the surfaces of cathodic metals.

13 Claims, 1 Drawing Sheet

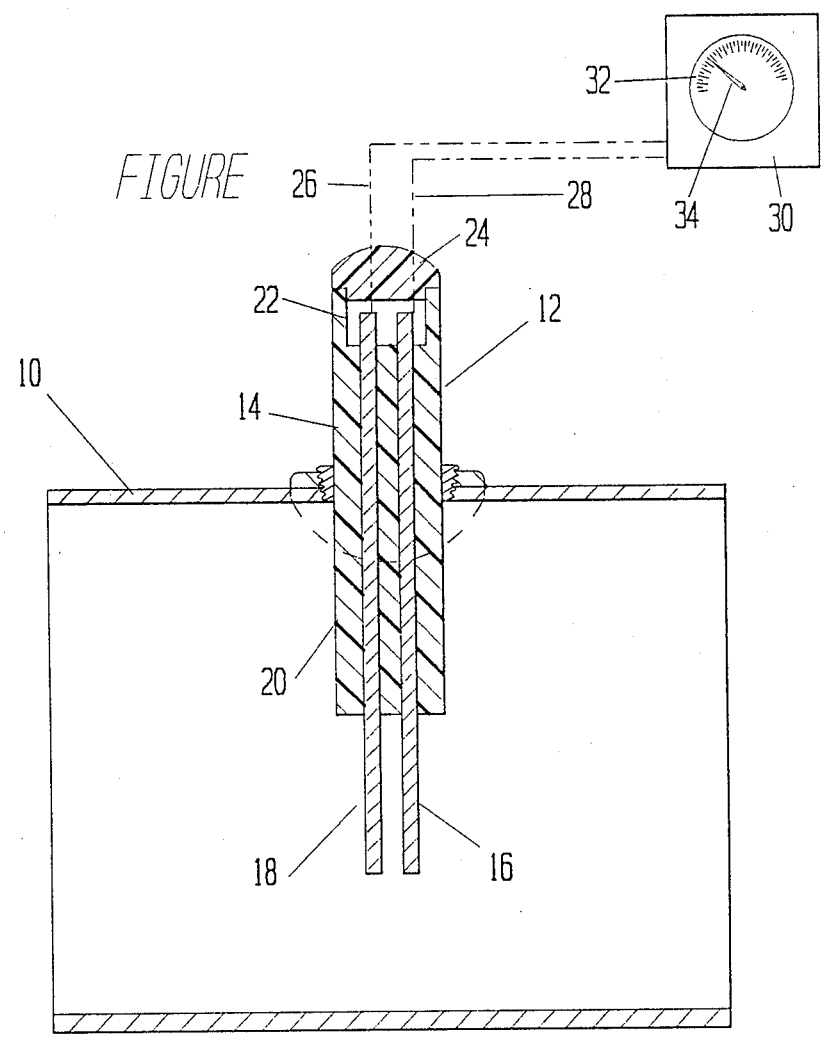

INHIBITING CORROSION BY WATER

BACKGROUND OF THE INVENTION

Field of Invention

This invention relates to a method for the treatment of water to prevent corrosion and, particularly, to the treatment of municipal water.

Background of the Invention

Municipal water distribution systems have, for countless years, been plagued with corrosion of metal surfaces exposed to the water. The corrosion is particularly acute when a galvanic cell is established with dissimilar metals which are connected by an external conductor allowing current flow.

Presently, the state of the art for corrosion prevention comprises saturating the water with calcium carbonate, using a technique or formula described as Langmuir's Index. Under this approach it is intended that equipment downstream of the treatment plant be subjected to a progressive deposition of calcium carbonate which theoretically passivates the metal surfaces and thus prevents further corrosion. This process is popular with many municipal water treatment facilities because of the low cost. The treatment, however, is dependent upon a number of uncontrolled variables, particularly variables such as: total dissolved solids, alkalinity, calcium carbonate, hardness and temperature of the water. For any given pH of the water, these variables must all be precisely controlled for predictable operation. Because of the large variation and generally uncontrollable nature of these variables, the prior art treatments have not been notably successful. It has been reported by Fair, G. and Guyer, J., *Water and Waste Water Engineering*, Vol. 2, Wiley) (1968) pp. 30:26 that failures to obtain passivation from calcium carbonate deposition results from inadequate concentrations of calcium and bicarbonate, the presence of chloride and sulfate ions, the stagnation of the water, the presence of carbon dioxide which rapidly dissolves any calcium carbonate deposits, the pH of the water which varies locally to a large extent particularly in an immediate vicinity of a corroded metal, electrical charges at the metal surface and the buffering capacity of the water. Thus, it is not surprising that a truly successful treatment method for inhibition of corrosion of municipal water supplies has not yet been developed.

Prior techniques which have also been practiced include the addition of phosphate corrosion inhibitors to the water. The addition of phosphates is highly unsuitable, particularly to an environmentally conscious public. Additionally phosphates cause difficulty during subsequent treatment of the water in sewage plants and the like. Thus, inhibition of corrosion with phosphates has largely fallen into disfavor and its practice has been sharply curtailed.

OBJECTIVES OF THE INVENTION

It is the object of this invention to provide a safe and effective treatment of inhibiting the corrosion of municipal water supplies.

It is a further object of this invention to provide a treatment for inhibiting the corrosion by municipal waters which does not present any environmental concerns.

It is an additional object of this invention to provide a method for treatment of municipal water supplies to inhibit water corrosion without the addition of any materials that would be objectionable in subsequent treatments, such as in sewage plants.

It is also an object of this invention to provide a method for the continuous monitoring of the effectiveness of the treatment method.

It is a further object of this invention to provide adjustment of the treatment method when anomalies are encountered which reestablish the corrosion by the water.

It is also an object of this invention to provide a continuous treatment method which will effectively eliminate corrosion by municipal water supplies.

BRIEF DESCRIPTION OF THE INVENTION

This invention comprises the protection of metal surfaces by the formation of a passivating coating of zinc silicate on the surfaces of the metals exposed to the water. In the treatment, the metal surfaces are preconditioned by a pretreatment step in which a water soluble zinc salt is added in an amount from about 0.5 to about 5 parts zinc per million weight parts of the water while the total alkalinity is maintained above 100 millequivalents by the addition of a water soluble alkaline material, as needed. The pretreatment is continued until the cathodic metal surfaces are passivated with a coating of zinc carbonate, as can be determined by measuring the magnitude of external current flow between electrodes of a test probe maintained in the water. When the metal has been coated with a film of zinc carbonate, typically after a few days to a week of continuous zinc salt addition, the addition of the zinc salt is ceased, and a water soluble silicate, particularly sodium orthosilicate or sodium metasilicate is added to the water in an amount from about 1 to 10 parts per million of silicate. This treatment deposits a protective coating of zinc silicate on the surfaces of the metal subjected to corrosion, particularly the surfaces of cathodic metals. The method includes continuous monitoring of the alkalinity of the water and maintaining the alkalinity of above 100 mil equivalents throughout the treatment. The method also includes monitoring the water with one or more test probes which comprise galvanic cells and observing the external current flow of the cells. In the event any abnormalities restore the corrosion by the water, the test probe current will increase. Thereupon, the pretreatment step is repeated to restore the passivation of the metal surfaces.

BRIEF DESCRIPTION OF THE DRAWINGS

The invention will be described with reference to FIG. 1, which shows a suitable test probe for use in practicing the invention.

DESCRIPTION OF PREFERRED EMBODIMENT

This method comprises the treatment of municipal water to reduce corrosion by the water. The method comprises multiple treatment steps which are practiced in succession.

In the first step of the treatment, a water soluble zinc salt is added to the water in an amount from about 0.5 to 5 parts zinc per million weight parts water. Although higher concentrations of the zinc could be added these are undesirable, particularly as the environmental protection agency has assigned a permissible level of zinc in drinking water at 5 parts per million. Additionally, it is preferred to avoid any cloudiness in the water, and this also limits the maximum amount of zinc which is added, as described below.

In many instances the amount of zinc which is added to the water will be substantially less than the maximum 5 parts per million mentioned above. To determine the precise amount of zinc which should be added to the water it is preferred to test the water and make an empirical determination of the amount required. This is preferred as many variables such as suspended solids, pH, hardness, etc. of the water can affect the amount of zinc which is desirable or necessary.

To determine the precise amount of zinc, a representative sample of the water is prepared and aliquot portions of the water are titrated with standardized solutions of the zinc salt. The titration is continued to a cloud point of the water, which is determined by visual observation of the water and when incipient cloudiness is observed, the quantity of zinc which has been added is determined. Since it is generally undesirable to cause cloudiness in municipal water supplies, the amount of zinc which is to be added in the method is reduced approximately 0.5 parts per million from the amount determined in the titration step. Thus, if the titration reveals that 3.5 parts per million of zinc causes incipient cloudiness, the amount of zinc which is to be added in the first pretreatment step of the method is reduced to 3.0 parts per million.

The water is also analyzed to determine its total alkalinity using a standardized inspection. This inspection comprises the titration of the water with an acid to a methyl orange endpoint having a pH 4.6. An identical sample is titrated with acid to its phenol-phthalein endpoint of pH 8.3. This titration gives all the caustic and half of the carbonate alkalinity. The total alkalinity is then expressed in parts per million of calcium carbonate.

In the treatment method, the total alkalinity of the water should be at least 100 millequivalents. In many localities, particularly in the Western States, the water will have sufficient alkalinity that an addition of an alkaline additive will not be necessary. Where, however, the total alkalinity of the water is less than 100 milequivalents, a water soluble alkaline material is added to the water to raise and maintain its total alkalinity above 100 milequivalents. The selection of the alkaline material can also be widely varied so long as a water-soluble alkaline material is selected which is effective in increasing the total alkalinity of the water to above the desired 100 milequivalents, without introducing any potentially objectional anion. Examples of suitable water soluble alkaline materials are: lime, calcium hydroxide, sodium hydroxide, sodium bicarbonate, sodium sesquicarbonate, sodium carbonate, and mixtures thereof. Of these, sodium carbonate is preferred as it provides two moles of bicarbonate alkalinity in accordance with the following reaction:

$$Na_2CO_3 + CO_2 + H_2O \rightleftarrows 2Na^+ + 2HCO_3^-.$$

The additives which are used for this treatment can be widely varied. As previously mentioned, a water-soluble zinc salt is used and suitable sources of water soluble zinc salt include zinc chloride, zinc sulphate, zinc sulfamate, and mixtures thereof. As the water which is being treated is a potable water, the selection of the zinc salt should exclude any salt having a potentially objectionable anion. Thus, inc phosphates are undesirable as it is generally desirable to avoid introducing any phosphates into the water.

The addition of the water soluble zinc is practiced for a sufficient period of time to passivate the metal surfaces in the entire water distribution system. The passivation will occur principally at the cathodic metal surfaces, as the formation of the zinc carbonate follows the following reactions:

$$Zn^{++} + OH + HCO_3^- = ZnCO_3 + H_2O$$

The reaction thus requires hydroxyl ions and a pH value of about 9.5, conditions which are satisfied in the immediate vicinity of a cathodic surface. The reaction occurs at a rate according to the zinc carbonate activity product ($K_{SO}$), as follows:

$$\frac{(Zn^{++})(CO_3^{--})}{(ZnCO_3)} = K_{so} = 6.4 \times 10^{-9}$$

As most municipal water systems are quite large and widespread, this treatment can last for a substantial length of time. Typically the pre-treatment step of adding the zinc salt will be practiced for a period of several days to possibly several weeks duration.

A convenient inspection to determine when the metal surfaces have been passivated with a zinc carbonate coating is to insert test probes, which are galvanic cells, into the water and monitor the external current of these probes. This monitoring is preferably continued throughout the entire treatment to determine if the water, for whatever reason, reverts to its corrosive nature.

A suitable test probe 12 is shown in the FIGURE mounted in a conduit 10. The probe is a galvanic cell having at least two conductor rods terminating as a pair of electrodes 16 and 18. The electrodes are of dissimilar metals, e.g., copper and steel, selected to have a suitably high difference in electromotive values. The conductors are permanently secured to a terminal plug 24 which contains connecting wires 26 and 28 that can extend to an external meter 30. The meter can be a conventional milliamp electrical current meter with a scale 32 and a needle indicator 34. The probe housing 14 is an insulating cylinder, preferably of plastic which extends through a gland that is permanently mounted on the conduit 10, so that the lower end 20 of the probe housing is surrounded by a flowing stream of water.

The probe is maintained in a flowing steam of the water. Preferably, a plurality of these probes are located at predetermined locations throughout the water distribution system. The terminal ends of the conductors from all of the probes can be connected into a suitable ammeter, e.g., an ammeter having a full deflection scale of about 1000 milliamps, through a selector switch to select any one of the plurality of test probes. Alternatively, the output of the electrolytic cells could be transmitted or broadcast to a central location at the treatment plant for display or continuous recording of the cell output to control the treatment steps.

When the treatment is first commenced, it will be observed that a very high current flow exists between the cell electrodes, typically on the order of several hundred milliamps. As the pretreatment with the soluble zinc salt progresses, while maintaining total alkalinity above 100 millequivalents, it will be observed that the external current gradually decreases and reaches a minimal value, either with no detectable or very low current flow.

At this point, the addition of the water soluble zinc salt is terminated and the addition of a water soluble silicate is immediately commenced. Suitable sources of water soluble silicates include the alkali metal ortho- and metasilicates, preferably sodium orthosilicate and sodium metasilicates, or mixtures thereof. The silicate is added to the water at a concentration of from 1 to about 10 parts of silicate per million parts water. Preferably, this addition of a water soluble silicate is practiced continuously throughout the treatment.

Upon the addition of the silicate, the external current flow, as observed in the test electrode cells, will remain at the minimal value achieved during the carbonate treatment.

The addition of the water-soluble silicate is effective to convert the sodium carbonate film deposited during the pretreatment stage to zinc silicate which effectively passivates the metal surfaces. This reaction proceeds in accordance with the following equation:

$$2ZnCO_3 + Na_4SiO_4 = Zn_2SiO_4 + 2Na_2CO_3$$

$$2ZnCO_3 + Na_2SiO_3 = ZnSiO_3 + 2Na_2CO_3$$

It has also been observed that the silicate will effectively form a protective coating even on the anodic surfaces of the metals in the treatment system, forming an insoluble iron silicate which further enhances the resistance of the metals to subsequent corrosion. This reaction proceeds in accordance with the following equation:

$$Fe(OH)_2 + Na_2SiO_3 = FeSiO_3 + 2NaOH$$

$$Fe(OH)_3 + Na_2SiO_3 = FeSiO_3(OH) + 2NaOH$$

Preferably the system is continuously monitored throughout the treatment. This is desirable as upsets or anomalies can be encountered in the water undergoing treatment which could revert the system to a corrosive condition. This will be immediately detected by the electrolytic cells located throughout the water distribution system as observed by a restoration of significant current flow in the external circuit of the cells. When this occurs, the treatment is discontinued and repeated.

Accordingly, when detectable corrosion is observed, the addition of the water soluble silicate is discontinued and a water soluble zinc salt is again added to the water while monitoring the corrosion with the electrolytic cells until the metal surfaces have become passivated. Thereupon the addition of the water soluble silicate is resumed and continued.

I have observed that this treatment of the water inhibits corrosion on cast iron, steel, galvanized iron, copper, brass and lead. I have also observed that concrete and asbestos cement pipe also receives a protective zinc silicate deposit which is expected to extend the service life of these materials also.

Often water systems are encountered where significant corrosion and scale are present. In these applications I prefer to precede the treatment of this invention with an additional pre-treatment step, which is the addition of the water soluble silicate to the water to displacing rusty tubercules on the surfaces of the metal. This can also improve the system by the removal of water flow impediments, thereby restoring a greater capacity to the water distribution system and improving the performance of the subsequent corrosion inhibition treatment of this invention. For this purpose a higher dosage of water soluble silicate, preferably from about 10 to about 35 parts per million is employed. It will be observed that this treatment will result in a temporary coloring of the water by the removal of the red iron oxide and hydroxide surfaces from the metal surfaces.

The invention will be illustrated by the following examples which are intended to demonstrate the method and illustrate the results obtainable thereby.

EXAMPLE I

In the following experiments, a municipal water was used having the following composition:

TABLE I

| | |
|---|---|
| Calcium | 28.8 mg/l |
| Magnesium | 8.4 |
| Sodium | 54.8 |
| Bicarbonate | 146.6 |
| Sulfate | 52.3 |
| Chloride | 35.9 |
| Total Hardness | 106.g mg/l CaCO$_3$ |
| Alkalinity | 120.2 mg/l CaCO$_3$ |
| TDS | 279.0 mg/l |
| pH | 7.56 |
| D.O. | 7.12 mg/l |
| CO$_2$ | 7.30 mg/l |

Two sets of five new metal specimens were prepared of the following metals: steel, cast iron, lead, zinc and copper. Additionally, two sets of asbestos cement and concrete were prepared. One specimen of each of the sets of metal and nonmetallic specimens was placed in an untreated flowing water stream to serve as a control. The second specimen of the metal and non-metallic specimens was placed in a flowing stream of the water which was treated in accordance with this invention.

In the treatment, zinc sulphate was added to the test water in an amount to provide three parts of zinc per million weight parts of water. This treatment was practiced for seven days and then the zinc sulphate addition was discontinued and sodium metasilicate was added in an amount sufficient to provide 11 parts silicate per million weight parts of water. The addition of the metasilicate was practiced through the remaining period of this experiment which lasted 83 days.

At the conclusion of the test, the specimens were removed from the water, dried and weighed and the net weight loss or gain was determined for each of the specimens. Results are reported in the following table:

TABLE II

| SPECIMEN TYPE | SPECIMEN WEIGHT DATA Grams of Material Lost (−) or Inhibitor Deposited (+) | | |
|---|---|---|---|
| | CONTROL | TREATED | REDUCTION |
| Steel (10:10) | .1500 | −.0027 | 98.2% |
| Cast Iron | −.1412 | −.0192 | 86.4% |
| Lead | −.0005 | +.0122 | Depositing |
| Aluminum | −.0174 | −.0016 | 90.8 |
| Zinc | −.0242 | −.0008 | 96.7 |
| Copper | −.0079 | +.0122 | Depositing |
| Asbestos Cement | −.0015 | +.0007 | " |
| Concrete | −.0006 | +.0055 | " |

The data indicated that the lead, copper, asbestos cement and concrete specimens actually gained weight during the test, indicating deposition of the inhibitor and complete absence of any net corrosive attack. The specimens of zinc, steel and aluminum demonstrated very little corrosion with a slight corrosion being observed on the cast iron specimen. This slight corrosion occurred mostly in the vicinity of a hole that had been drilled through the specimen for attachment of a support member.

A chemical analysis was made of the cathodic areas of the control and treated steel specimens. I observed that the upper section of the steel specimens used in the control (untreated water) consisted of 80% magnetite ($FeO \cdot Fe_2O_3$), while the lower portion was found to be pitted and coated with ferrous carbonate. In the anodic specimens which were exposed to the treated water, the metal was coated with a mixture of ferric oxide and ferrous silicate. The cathodic surfaces of the steel specimens were coated with a white deposit which contained both zinc and silica. On the basis of these results and chemical analysis, I have concluded that the treatment of the invention provides both anodic and athodic corrosion inhibition thereby effectively reducing the corrosive attack of aerated water on both metals and non-metals commonly used in a domestic water distribution system.

EXAMPLE II

A pair of bi-metallic probes such as depicted in the FIGURE of this application were prepared. The probes prepared using a pair of copper and steel rods, one half inch wide by 1/16 inch thick and three inches long. The rods were separated by a non-conducting spacer (solid polyethylene core), and connected electrically through an external circuit. The test probes were placed in water streams flowing at a rate of one half gallon per minute using the water identified in the preceding example. For a two day period the electrodes of the assemblies were shorted out with a direct wire connection and observed to have an electrochemical potential of 0.75 volts. The submerged copper surfaces were anodic to the steel and became sacrificial metal anodes.

After the initial two day conditioning, one of the probes was placed in a flowing water stream to which had been added 3 parts per million zinc during a period of four days. At the start of the test, the terminals were connected through a multimeter and the current flow was observed. Throughout the test the current flow was monitored in the control in the control electrode cell as well as the cell which was placed in the treated water. Readings were determined daily and are reported in the following table:

TABLE III

| | TEST PROBE CORROSION CURRENT | | |
|---|---|---|---|
| TIME (Days) | INHIBITOR TREATMENT | (PROBE CURRENT IN MICROAMPHERES) | |
| | | TREATED | CONTROL |
| 0 | 3 ppm $Zn^{++}$ | 200 | 200 |
| 1 | " | 138 | 275 |
| 2 | " | 80 | 360 |
| 3 | " | 12 | 440 |
| 4 | 12 ppm $Na_2SiO_2$ | 10 | 525 |
| 5 | " | 5 | 590 |
| 10 | " | 8 | 630 |
| 20 | " | 17 | 645 |
| 30 | " | 10 | 650 |

At the conclusion of the study I observed the steel anodes on the control and treated probe were heavily rusted. The steel electrode which was in the treated water exhibited a reddish orange deposit similar to ferris silicate, while the control steel electrode was encrusted with dark red iron oxide deposits. The copper cathode of the test probe which had been in the treated water had a thin deposit of white zinc silicate over its entire surface while the control had a complete absence of any coating or film.

The test demonstrates the effectiveness of the treatment process in passivating active corroding water systems and also illustrates the precision of control that can be achieved over the system by observation of the external current flow in the electrode cells.

The preceding examples are intended solely to illustrate a mode of practice and demonstrate results obtained by the invention and are not intended to be unduly limiting to the invention.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

I claim:

1. A method for the treatment of municipal water to prevent corrosion of metallic equipment and surfaces in contact with water, which comprises:
   a. adding to said water a water soluble zinc salt in an amount from 0.5 to about 5 parts zinc per million weight parts of water, and exposing said surfaces to said water containing said water soluble zinc salt;
   b. adding to said water, a water soluble alkaline material selected from the group consisting of sodium carbonate, sodium hydroxide, calcium hydroxide, and mixtures thereof, in an amount, as necessary to maintain the total alkalinity of the water above 100 milligrams per liter;
   c. maintaining said exposure of said surfaces to said water for a sufficient period of time to passivate said surfaces with a coating of zinc carbonate on said surfaces;
   d. thereupon ceasing the addition of said water soluble zinc salt, and adding to said water a water soluble silicate selected from the class consisting of sodium orthosilicate, sodium metasilicate, and mixtures thereof in an amount from 1 to about 10 parts per million weight parts of water.

2. The method of claim 1 wherein step b is continued throughout the addition of said water soluble silicate to said water in step d.

3. The method of claim 1 which comprises monitoring the corrosion characteristic of said water with a corrosion cell comprising an anode electrode and cathode electrode and measuring the external cell current flow between said electrodes during step c to determine when said metal surfaces become passivated in step c.

4. The method of claim 1 which comprises monitoring the corrosion characteristic of said water with a corrosion cell comprising an anode electrode and cathode electrode and measuring the external cell current flow between said electrodes during step d.

5. The method of claim 4 which comprises the steps of discontinuing step d and resuming steps a through c when the external cell current flow exceeds a predetermined maximum value.

6. The method of claim 1 which includes the step of analysis of the water prior to treatment for total alkalinity to determine when the addition of a water soluble alkaline material becomes necessary.

7. The method of claim 6 wherein said analysis of water for total alkalinity is repeated after said treatment.

8. The method of claim 1 wherein the amount of water soluble zinc salt to be added to the water during step a is determined by titrating aliquot portions of said water with standard solutions of said water soluble zinc salt to an end point observed as the formation of cloudiness in said water.

9. The method of claim 8 wherein the amount of zinc salt added in step a is from 0.2 to about 0.7 parts per million of water less than that amount determined by titration to cause cloudiness in said water.

10. The method of claim 8 wherein said water soluble silicate is selected to be sodium metasilicate.

11. The method of claim 1 wherein said water soluble zinc salt is selected to be zinc chloride.

12. The method of claim 1 wherein said water soluble silicate is selected t be sodium metasilicate.

13. The method of claim 1 wherein said water soluble silicate is selected to be sodium orthosilicate.

* * * * *